Patented Apr. 28, 1931

1,802,641

UNITED STATES PATENT OFFICE

ALICE MAUDE FAIRCHILD AND EMORY LEE RATHBURN, OF CHICAGO, ILLINOIS, ASSIGNORS, BY MESNE ASSIGNMENTS, TO THE MANTLE LAMP COMPANY OF AMERICA, OF CHICAGO, ILLINOIS, A CORPORATION OF ILLINOIS

PORCELAIN AND METHOD OF MAKING SAME

No Drawing. Application filed August 23, 1928. Serial No. 301,694.

The present invention relates to porcelain and methods of making same.

More particularly the present invention relates to the manufacture of an improved refractory ceramic product of the nature of porcelain containing a large percentage of zirconium compounds including a refractory phosphate of zirconium and our invention includes both the product and the method of producing such an improved porcelain which consists in firing a porcelain body mixture containing zirconium oxide together with zirconium acid phosphate. The temperature of the fusing point of the zirconium acid phosphate corresponds to about that of Segar cone 10 while the more refractory zirconium pyro-phosphate fuses only at temperatures above cone 27. As will be understood by those skilled in the art this invention enables an improved zirconium phosphate porcelain to be produced that will be thoroughly vitrified and which may contain as high a percentage of the very refractory zirconium compounds as is desired for the various grades of porcelain required for different purposes. The introduction of said variable amounts of fusible acid phosphates into the unfired porcelain body serves as perfect fluxing agents and may be used to the exclusion of all other fluxing agents if desired during the firing operation for maturing the porcelain although they are converted thereby so that they become in the matured finished porcelain the very refractory neutral phosphates. The chemical reaction which converts the fusible fluxing acid phosphate into the refractory phosphate of the finished porcelain is represented by the withdrawal of one molecule of phosphorus pentoxide ($P_2O_5$) from the fluxing agent, also one molecule of the zirconium oxid ($ZrO_2$) also present in the unfired body combines with this molecule of ($P_2O_5$) and forms a molecule of ($ZrP_2O_7$) zirconium pyro-phosphate in the finished porcelain.

We have found when it is required to produce a zirconium phosphate porcelain developing and maturing at a lower kiln temperature that the addition of comparatively small amounts of alkaline earth acid phosphate such as calcium acid phosphate ($CaP_2O_6$) or magnesium acid phosphate ($MgP_2O_6$) may be added to the unfired porcelain body and such an addition greatly facilitates the vitrification.

It will be understood that (three parts) these fluxing agents also react with (two parts) the zirconium oxid present in the mixture and transfer during the firing operation (two parts) of their ($P_2O_5$) to the ($ZrO_2$) zirconium oxid in the body and which forms the very refractory pyro-phosphate of zirconium ($ZrP_2O_7$) at the same time the (three parts) alkaline earth acid phosphates are converted into the very refractory ortho phosphates such as calcium ortho phosphate ($Ca_3P_2O_8$) or ($Mg_3P_2O_8$).

The present invention relates to a method of producing an improved vitrifiable and homogeneous ceramic substance, which may contain high percentages of zirconia and zirconium salts, which substance is adapted to serve as an efficient dielectric under severe conditions of high pressure and high frequency electrical oscillations while exposed to elevated and rapidly varying temperatures.

An object of the present invention is to provide a ceramic substance which combines high dielectric qualities and mechanical strength with a quality of resistance to structural deterioration which tends to devleop due to electrical and mechanical strains at high temperatures.

A further object is to provide a porcelain as above referred to without excessive dilution with energetic positive electrolytes such as feldspar, which excesses have formerly been considered essential in overcoming the passivity of zirconium compounds in forming suitable ceramic compositions.

Our invention comprises a method of forming a ceramic composition of matter which utilizes the properties of the oxides of phosphorus in forming definite refractory compounds with such nearly neutral substances as zirconia.

We attain these objects by taking advantage of the properties of the oxides of phosphorus in forming definite refractory compounds with compounds of such nearly neutral elements as zirconium, certain of which compounds being capable, at temperatures available in the art, of forming with refractory clays mechanically strong bodies, which show greatly improved dielectric factors throughout the higher range of working temperatures. The compounds of the oxide of phosphorus with zirconia are formed directly during the regular firing operation, from the several elements introduced into the unfired porcelain body in the form of fusible fluxing agents such as zirconium acid phosphate with or without the addition of other more fusible alkaline earth and phosphates such as acid phosphates of calcium and magnesium.

As one example of our improved method we have employed in combination with clay and zirconia, an oxide of phosphorus compound frit formed from normal zirconium phosphate ($ZrP_2O_7$) as precipitated from an acid solution which is mixed with an excess of phosphoric acid ($H_3PO_4$) and calcined, the acid phosphate frit is mixed with a suitably refractory grade of white burning bond clay, said combination being pyro-chemically treated to produce our improved porcelain.

A similar acid phosphate fluxing frit is attainable by the phosphating of a precipitated zirconium hydroxid, with the phosphoric acid ($H_3PO_4$) followed by calcination.

As an illustration of our invention we have found that, in a substance having nearly 60% of total zirconium content, compounded in this manner we have found that as little as 4% of magnesium and 1% of calcium in the form of acid phosphates will cause this body to become thoroughly dense and vitreous at an approximate temperature of 1400° C., cone 13, with a nearly neutral kiln atmosphere.

As a further illustration of this process we have obtained similar results from less pure materials by employing a suitable grade of acid (sulphuric) washed baddeleyite, which may carry zirconia in excess of 80%, with a silicon content as high as 14% and varying amounts of titanium, aluminum and iron. In this case, a relatively large amount of this impure zirconia may be employed in connection with an acid phosphate of zirconium and carried in a more plastic fatter bond clay, such softer grades of clay being rendered more refractory by means of the silica released from the zirconium ore during the acid washing process. Where this native oxide is employed, we have also overcome the difficulties commonly encountered in producing a white or clean burning ware from such crude materials, by maintaining an oxidizing condition of kiln atmosphere during certain intermediate stages of the firing operation.

Actual tests of samples of this improved ceramic structure have indicated a factor of electrical resistance in excess of fourteen times that of a standard porcelain dielectric body under similar conditions, that is at the relatively high temperature of 700° C. This clearly proves that the phosphates used in this invention as a substitute for the feldspar of ordinary porcelain is a much improved fluxing agent and aids in producing a new and improved result. Much of the improvement in the zirconium porcelain is known to be due to the substituting of zirconium oxide for the larger part of the silicon oxide of the ordinary porcelain, but most of the improvement over feldspar porcelain, especially for electrical insulation, is due to the elimination of feldspar.

The present invention contemplates a dielectric vitrified ceramic body consisting of zirconium compounds in combination with clay, together with refractory pyro-phosphorus compounds. Furthermore, the present invention contemplates the method of producing refractory ceramic compositions of matter wherein the properties of acid phosphorus compounds have been depended upon to effect a complete reaction at temperatures commonly available in the art with such neutral elements as zirconia.

The present invention also contemplates the method which takes advantage of the properties of such neutral elements as zirconium in a sulphated form to combine with acid phosphorus compounds in connection with a clay carrier, whereby kiln reactions are facilitated and the elimination of contaminations is also facilitated.

The composition of matter produced according to the present invention is a homogeneous ceramic structure having very good factors of thermal expansion and of thermal electrical values. The formation of crystals is controlled by means of extremely rapid temperature reductions at the finish of the firing operation without risk of breakage. An additional and equally important advantage is had by the reason of the fact that only a minimum of fluxing agents are present due to the fact that the acid phosphate compounds which served as a flux during the firing and maturing of the structure have mostly been converted into refractory pyro compounds in the finished body. The present application is a continuation in part of the prior application No. 654,777, filed on July 30, 1923.

Having now described our improved porcelain and the improved fluxing agent that is introduced into said body and which overcomes many of the defects caused by feldspar and having described the method by which a highly refractory structure containing a large percentage of zirconium compounds and practically free from feldspar may be produced, what we claim is:

1. An improved porcelain comprising clay, zirconium and refractory neutral compounds of phosphorus.

2. An improved porcelain consisting of a ceramic structure composed essentially of zirconium compounds and containing ortho phosphate compounds of calcium and magnesium which result from the withdrawal of phosphoric oxid from the acid phosphate fluxing materials.

3. The method of producing an improved zirconium porcelain which consists in firing a mixture of zirconia, clay and acid phosphates of zirconium, magnesium and calcium which will yield ortho phosphates of calcium and magnesium as constituents of the finished porcelain structure.

4. An improved porcelain, characterized by containing a large proportion of zirconium compounds, and ortho phosphates of magnesium and calcium.

5. The method of producing an improved porcelain which consists in firing a body mixture comprising clay, zirconia, zirconium acid phosphates and alkaline earth acid phosphates.

6. The method of producing an improved zirconium porcelain which consists in firing a mixture of zirconia, clay and acid phosphates of alkaline earths by which method the fusible acid phosphates of the unfired body are converted into refractory ortho and pyro compounds in the finished porcelain.

7. The method of producing an improved porcelain which consists in firing a porcelain body mixture comprising clay, zirconia and acid phosphate of zirconium by which method the fusible acid phosphate of the fluxing agent is converted during the firing operation into the very refractory zirconium pyro-phosphate that remains in the finished porcelain.

8. An improved porcelain consisting of a refractory ceramic structure composed principally of clay and zirconium compounds and containing refractory ortho phosphate compounds of alkali earths and refractory phosphate of zirconium.

9. An improved porcelain characterized by containing a large amount of zirconium compounds in place of a large part of both the free silica and the feldspar of ordinary porcelain, said improved porcelain also containing refractory zirconium phosphates such as zirconium pyro-phosphate ($ZrP_2O_7$).

10. The method of producing porcelain, which includes kiln firing a body mixture comprising clay, refractory zirconium compounds and a fluxing agent comprising fusible acid phosphates.

11. A method of producing porcelain which includes firing a body mixture of clay, zirconium oxid and zirconium acid phosphate.

12. The method of producing an improved zirconium porcelain which consists in forming a mixture of zirconia, clay, and acid phosphates of zirconia, magnesium and calcium, firing the mixture and thereby causing the formation as constituents of the finished porcelain structure phosphates of calcium and magnesium.

13. The method of producing an improved zirconium porcelain which includes forming a mixture of zirconium compounds and clay and fusible acid phosphates of calcium and magnesium, firing the mixture, and thereby employing the phosphorus compounds during the course of the firing first as fluxes and later for the formation within the porcelain body, by the transfer of their excess of phosphorus pentoxide, of pyro-phosphate of zirconium.

Signed at Chicago, in the county of Cook and State of Illinois, this 21st day of August, A. D. 1928.

ALICE MAUDE FAIRCHILD.
EMORY LEE RATHBURN.